(12) United States Patent
Chevalier et al.

(10) Patent No.: US 6,386,237 B1
(45) Date of Patent: May 14, 2002

(54) ABRASIVE MATERIAL TRANSPORT HOSE WITH WEAR DETECTING SENSORS

(75) Inventors: Ronald Marcel Chevalier, St-Luc; Andre Georges Cook, Granby, both of (CA); Thomas Goodsell Hutchins, Uniontown, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/913,205

(22) PCT Filed: Apr. 12, 1999

(86) PCT No.: PCT/US99/07899

§ 371 Date: Aug. 9, 2001

§ 102(e) Date: Aug. 9, 2001

(87) PCT Pub. No.: WO00/61472

PCT Pub. Date: Oct. 19, 2000

(51) Int. Cl.$^7$ .......................... F16L 55/00; G01D 21/00
(52) U.S. Cl. ...................... 138/104; 138/127; 138/123; 116/208
(58) Field of Search ................................ 138/104, 103, 138/123–127, 177, 178; 116/DIG. 7, 227, 204, 208; 73/40.5 R, 49.1, 49.5

(56) References Cited

U.S. PATENT DOCUMENTS

| | | | |
|---|---|---|---|
| 2,759,175 A | 8/1956 | Spalding | 340/242 |
| 4,446,892 A | 5/1984 | Maxwell | 138/104 |
| 4,474,217 A | 10/1984 | DeMarse et al. | 138/137 |
| 4,554,650 A | 11/1985 | Brown et al. | 367/154 |
| 4,617,822 A | 10/1986 | Davis | 138/36 X |
| 5,228,478 A | 7/1993 | Kleisle | 138/104 |
| 5,267,670 A | 12/1993 | Foster | 138/104 X |
| 5,305,798 A | 4/1994 | Driver | 138/98 |
| 5,634,497 A | 6/1997 | Neto | 138/127 |

FOREIGN PATENT DOCUMENTS

| EP | 0058653 | 8/1982 |
|---|---|---|
| JP | 09119584 | 5/1997 |

Primary Examiner—Patrick Brinson
(74) Attorney, Agent, or Firm—Howard M. Cohn

(57) ABSTRACT

The useful life of an abrasive material transport hose (10) can be maximized if the hose is repositioned at the first signs of internal wear. This is accomplished by disposing at least two wear sensing elements (17, 21), each at a specified distance from the inwardmost surface of the inner tube (12), and each monitoring a condition indicative of wear of the hose (10) at its specified distance from the inwardmost surface of the inner tube. When the innermost wear sensing element (17) implies wear, the hose can be repositioned to extend the useful life until the outermost wear sensing element (21) indicates wear requiring replacement of the hose.

10 Claims, 3 Drawing Sheets

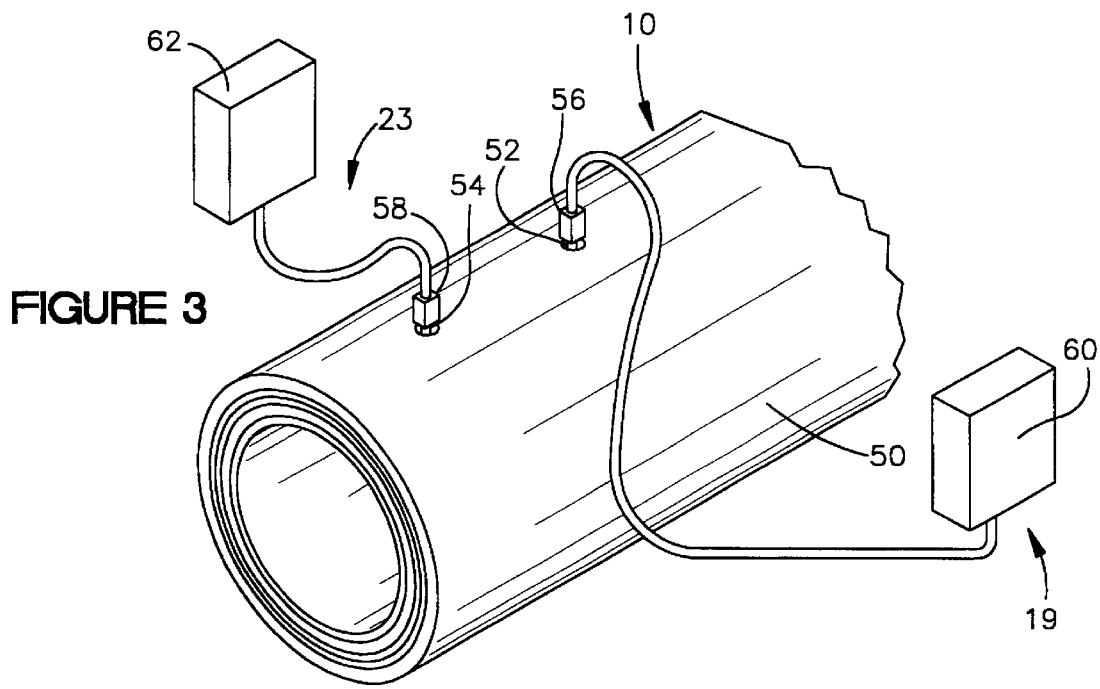
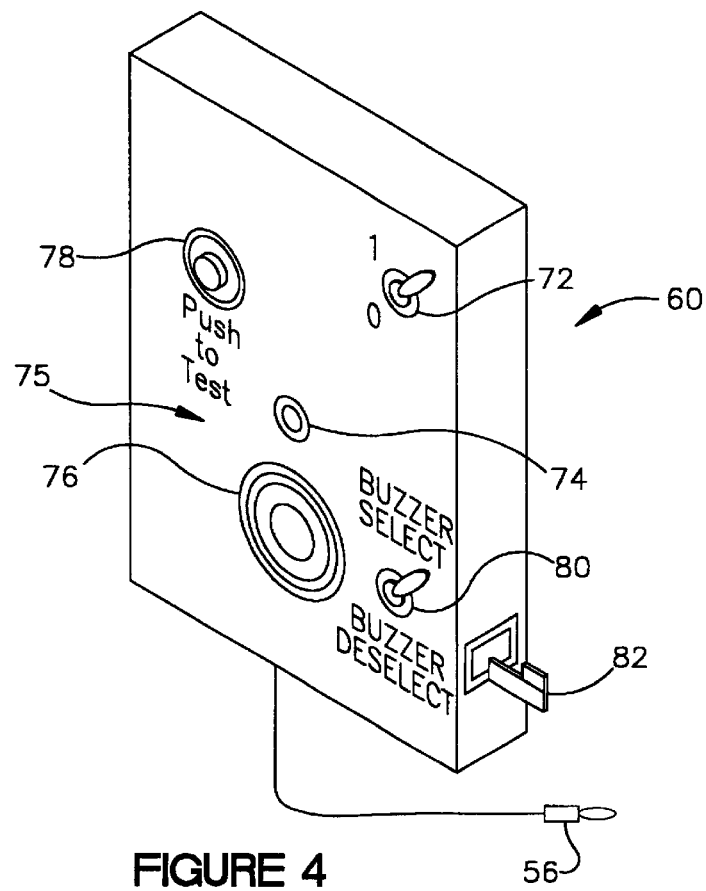

ABRASIVE MATERIAL TRANSPORT HOSE WITH WEAR DETECTING SENSORS

FIELD OF THE INVENTION

The invention relates to a hose for transporting abrasive material and in particular to a hose for transporting abrasive material having sensors for detecting wear of the hose.

BACKGROUND OF THE INVENTION

A hose for transporting abrasive material, either fluidized or dry bulk, is usually constructed with an inner lining or tube made of abrasion resistant material, a carcass composed of layers of reinforcement plies to resist pressure within the tube and a rubber cover, typically of an elastomeric materials, to protect the carcass. The hose may include, a reinforcing steel wire helix embedded between the layers and a built-in coupling at each end.

Since the hose is used for transporting abrasive material, the inner lining and reinforcing layers of the hose can be worn through by the flow of the material during usage. Since the wear is within an internal section of the hose, it is not possible to visually inspect the degree of wear. The hose, if operated until total failure, can create unforeseeable and unwanted problems including leakage, rupture or explosion.

U.S. Pat. No. 4,446,892 ('892) by Maxwell discloses a fluid transport hose having two or more plies comprising a sensing element located between the plies, the sensing element being adapted to respond to the failure of an inner ply of the hose by presenting an open circuit. The purpose of the sensing element in the hose is to detect imminent breakdown of a hose section and to permit the user to replace the hose prior to external leakage. The '892 patent also discloses a secondary sensing element disposed between the outermost plies of the hose to detect the occurrence of physical damage to the outer plies of the hose.

U.S. Pat. No. 5,634,497 ('497) by Neto discloses a hose for suction and discharge of abrasive material with a sensor circuit which indicates the total or partial wear of the inner lining of the hose, thus permitting hose replacement prior to its rupture or blow up. The '497 patent discloses a sensing element comprised of a bi-polar (two-pole) socket fixed to one of the external layers of the hose and connected, preferably, to the terminal ends of wires which extend spirally along the entire length of the hose. In order to determine the wear of the hose, it is necessary to verify, by means of the bi-polar socket, the continuity of the sensing element. In the case where the sensing element is interrupted, this means that the wire wound within the hose has been broken, implying that the hose shows signs of internal wear and should be replaced.

OBJECTS AND SUMMARY OF THE INVENTION

It is an object of the present invention to provide an improved hose using a sensing system to detect the internal wear of a hose, as defined in one or more of the appended claims and, as such, having the capability of being constructed to accomplish one or more of the subsidiary objects.

It is another object of the present invention to provide a hose capable of transporting abrasive material, either dry bulk or fluid.

It is a further object of the present invention to detect wear of the hose without interrupting the transport of the abrasive material.

It is yet another object of the present invention to detect wear of the hose to avoid an operating accident such as leakage, rupture, and explosion.

It is still another object of the present invention to provide multiple levels of hose wear detection in order to permit hose reposition prior to replacement in order to maximize the hose's useful life.

It is an object of the present invention to provide a hose with a wear-sensing element, which can be disposed within the tube or between the reinforcement plies of the hose using either wire or chemically sensitive tape.

In accordance with the invention, a hose for transporting abrasive material comprises first and second wear-sensing elements, one disposed at a first distance from the innermost surface of the inner lining (tube) and a second disposed at a second distance from the innermost surface of the inner lining (tube), the second distance being greater than the first distance. By monitoring the first and second wear-sensing elements with wear sensing devices, it is possible to detect wear of the inner lining and further wear as it propagates to one of the many layers disposed over (radially outward) the inner lining.

The first wear-sensing element is disposed adjacent to or within the inner lining (tube) or one of the reinforcement plies, running substantially the entire length of the hose. The first wear-sensing element, made up of a first set of two sensor wires, extends spirally over the length of the hose. One end of the first set of two sensor wires making up the first wear-sensing element are joined together. The other end of the first set of two wires making up the first wear-sensing element are connected to a first two-pole socket.

The second wear-sensing element comprises a second set of two sensor wires, each of the two sensor wires having one end extending to or even beyond one end of the hose and an opposite end extending to or even beyond the other end of the hose and joined (spliced) together. At the one end of the hose, the second set of sensor wires are connect to a second two-pole socket.

The means or structural components to detect wear is provided by connecting to the first and second two-pole sockets, through which the first and second wear-sensing elements can be monitored. Sensing wear at the first, innermost wear-sensing element permits the user to reposition the hose so as to continue operation until wear is sensed at the outermost second wear-sensing element, at which point the hose needs to be replaced prior to its failure during use. Repositioning the hose after sensing wear in the innermost layers of the hose extends the useful life of the hose.

BRIEF DESCRIPTION OF THE DRAWINGS

The structure, operation, and advantages of the present preferred embodiment of the invention will become further apparent upon consideration of the following description taken in conjunction with the accompanying drawings, wherein:

FIG. 3 is a perspective view of the hose of FIG. 2 showing a completed hose of this invention, incorporating two wear sensor circuits and a wear-sensing device attached to each circuit;

FIG. 4 is a detailed view of a wear-sensing device of FIG. 3, including local annunciation and optional remote station connection;

DETAILED DESCRIPTION OF THE INVENTION

Figure 1:
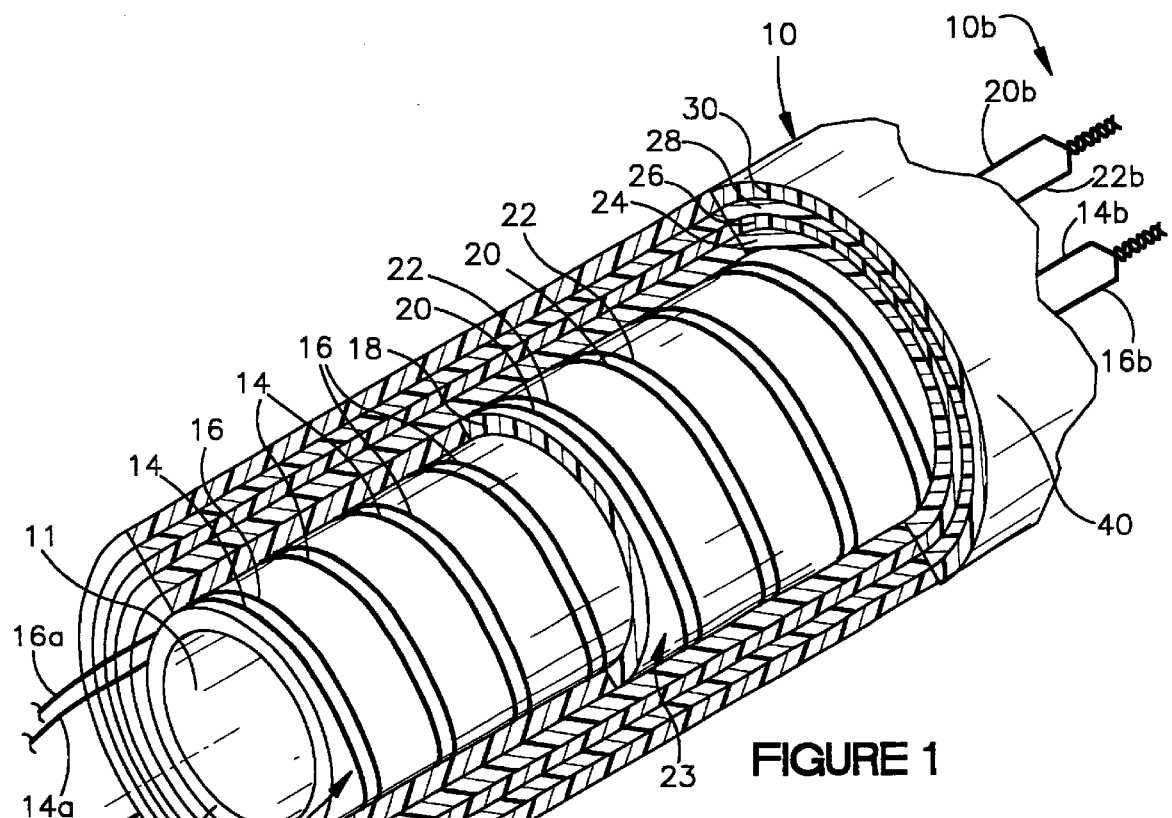
FIG. 1 is a perspective view, partial cutaway, of a section of an embodiment of a hose of this invention incorporating sensor wire applied over the length of the hose.

A hose for transporting abrasive material wears due to the effects of contact with the material being transported. Wear initiates on the inner lining and then propagates to subsequent reinforcement layers until total failure of the hose occurs, resulting in leakage, rupture, or explosion.

From the prior art, it is known that wire may be disposed in a hose in order to detect the wear of inner layers to permit replacement prior to total failure of the hose. Wire used for this purpose is called "sensor wire". A "wear sensing element" comprises a layer of sensor wire in a hose. A layer of hose surrounded by a wear-sensing element is called a "sensed layer". A device used to monitor a wear sensing element is called a "wear sensing device". A "wear sensing system" comprises a wear sensing device attached to a wear sensing element.

A sensed layer, either an inner lining (also called a tube herein) or a reinforcement ply covering the tube, wears due to the effects of the abrasive material being transported. Once the sensed layer has worn through, the abrasive material can make contact with and cause wear of the sensor wire in the wear sensing element. A wear sensing system determines whether the wear sensing element is worn by testing for continuity. The presence of continuity of the wear sensing element implies that the sensed layer is not worn. Conversely, the absence of continuity of the wear sensing element implies wear of the sensed layer.

A hose of the present invention includes at least two distinct wear sensing elements. The use of multiple wear sensing elements permits the detection of wear at different depths of the hose. As is commonly understood in the industry, the wear of a hose in abrasive material applications typically occurs at specific points within the hose, typically where the hose has a bend in it. The wear sensing element for the innermost sensed layer provides the first indication of hose wear. Wear detected at the innermost sensed layer permits the user to know when a hose should be repositioned (typically rotated) to transfer the material abrading to other locations of the hose inner layers, thereby extending the useful life of the hose. This process can be repeated until wear is detected in the outermost wear sensing element, implying wear in the outermost sensed layer, indicating the need for hose replacement.

The aforementioned U.S. Pat. No. 5,634,497 to Neto discloses a hose with two layers of sensor wire arranged so as to form only one wear sensing element. In contrast thereto, the hose of the present invention has at least two wear sensing elements and corresponding at least two wear sensing systems arranged such that, in the case of two wear sensing elements, the inner wear sensing element detects the initiation of wear in the inner lining and the outer wear sensing element detects propagation of wear to a subsequent, outwardly disposed reinforcement layer.

U.S. Pat. No. 4,446,892 to Maxwell discloses a hose with two wear sensing elements, the sensing elements arranged such that the inner sensing element detects wear in the inner lining, and the outer sensing element detects damage to the hose exterior. In contrast thereto, the at least two sensing elements of the present invention are arranged such that the progress of a wear problem can be "tracked" as it propagates from the inner lining to subsequent reinforcement layers.

FIG. 1 shows a preferred embodiment of the hose 10 for transporting abrasive material of the present invention in a partially completed stage of construction. The hose 10 has two ends 10a and 10b, and comprises an inner, preferably wear-resistant elastomeric lining (tube or tubes) 12 having an innermost surface 11. A first set of sensor wires 14 and 16 are spirally wound on the inner lining 12 and extend to or even beyond both ends of the hose 10. The first ends 14a and 16a of the sensor wires 14 and 16, respectively, extend to or even beyond the end 10a of the hose 10 and are connected to a two-pole socket 42. The opposite second ends 14b and 16b of the sensor wires 14 and 16, respectively, extend to or even beyond the opposite end 10b of the hose 10 and are connected (spliced) to one another.

In this manner, the two sensor wires 14 and 16 effectively form a single wear sensing element 17 extending along the entire length of the hose 10 over a "sensed layer" 13. The single wear sensing element 17 has two ends 14a and 16a which typically extend to one end 10a of the hose 10. As described hereinbelow, the 'free ends' 14a and 16a of wires 14 and 16, respectively, are connected to a conventional two-pole socket 42, and a wear sensing device 60 is attached to the wear sensing element 17 via the socket, to form a "wear sensing system" 19. According to the invention, additional wear sensing elements 21 may be formed in the hose 10 to monitor progress of abrasion as it propagates from the sensed layer 13 of the hose towards an outer sensed layer 23 of the hose.

The second sensed layer 23 of tube or reinforcement ply is applied over the wear sensor wires 14 and 16. In a manner similar to that described hereinabove with respect to the wear sensing element 17, a pair of sensor wires 20 and 22 are spirally wound around the layer 18 of reinforcement ply and typically extend to or even beyond both ends 10a and 10b of the hose 10. The free ends 20a and 22a of the sensor wires 20 and 22 can extend to or beyond the end 10a of the hose 10 and are connected to a conventional two-pole socket 44. The ends 20b and 22b of the sensor wires 20 and 22 extend to or beyond the opposite end 10b of the hose 10 and are connected (spliced) to one another to complete a second wear sensing element 21. The wear sensing element 21 is used to detect wear in the "sensed layer" 23.

In this manner, two wear sensing elements 17,21 are provided in the hose 10. The first wear sensing element 17 comprises the sensor wires 14 and 16 and is disposed at a first distance from the most inner surface 11 of the inner lining 12. The second wear sensing element 21 comprises the sensor wires 20 and 22 disposed at a second distance which is greater than the first distance from the most inner surface 11 of the inner lining 12.

Additional layers of reinforcement ply, as represented by ply layers 24, 26, 28, 30 (24–30), are disposed over the sensed layers 12 and 23. In addition, reinforcing steel wire helix wires (not shown) can be embedded between the ply layers as is conventionally known in the hose construction art. In the manner described hereinabove, additional wear sensing elements can be incorporated into the hose construction, over any one of these additional ply layers, at increasing distances from the inner surface 11 of inner lining 12, to provide additional levels of wear detection, as may be desired.

Figure 2:
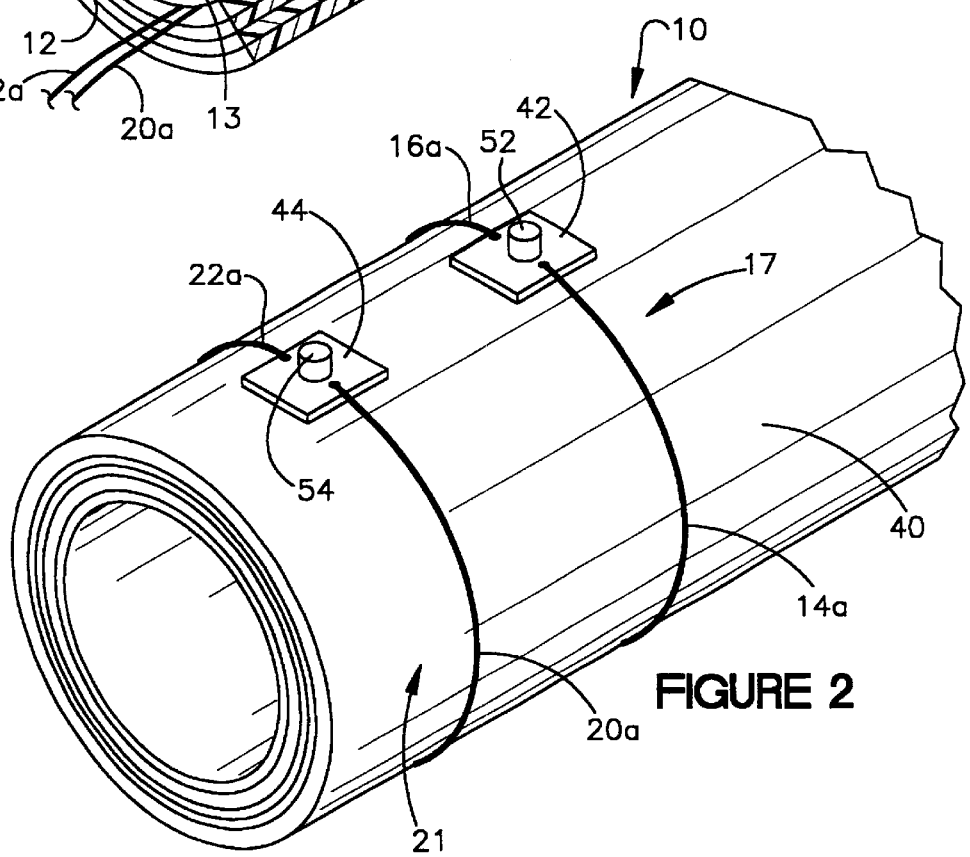
FIG. 2 is a perspective view of the hose of FIG. 1, showing a later stage of construction, incorporating two-pole sockets connected to sensor wire and assembled on the hose.

FIG. 2 shows a further stage of construction of the hose 10 of the present invention. On the outmost shown layer 40 of reinforcement ply, first and second two-pole sockets 42,44 are affixed by any conventional means, and are connected to free ends 14a, 16a and 20a, 22a, respectively, of the sensor wires 14,16 and 20,22 of sensing elements 17,21, respectively. At the opposite end of the hose 10, free ends 14b, 16b, 20b, 22b of the sensor wires 14, 16 and 20, 22 are spliced together as shown in FIG. 1. While the wires 14,16 and 20,22 are shown spliced together, it is within the terms of the present invention to join them in any conventional manner including forming them of a single length of sensor wire. As shown in FIG. 2, sensor wires 14,16 and the first two-pole socket 42 represent the first wear sensing element 17 and sensor wires 20,22 and second two-pole socket 44 represent the second wear sensing element 21.

FIG. 3 shows a completed construction of a typical hose 10 of the present invention. The hose 10 receives an outermost cover layer 50 to protect the plies 24–30 forming the hose carcass, thus enclosing the two-pole sockets 42,44 (shown in FIG. 2) and exposing terminal ends 52,54, respectively. While the sockets 42,44 are shown as being mounted within the hose 10, it is also within the terms of the invention to mount the sockets on the exterior of the hose, i.e. upon the cover layer 50, so that they can be easily replaced with other sockets depending on the particular installation. A user inserts plugs 56,58 of wear sensing devices 60,62 (described hereinafter with regard to FIG. 4) into terminal ends 52,54, respectively, of two-pole sockets 42,44 to detect the degree of internal wear of hose 10.

Hose 10 is generally constructed in accordance with techniques already known for manufacturing of hoses used for transporting abrasive materials. For example, hose 10 may be constructed with various inner diameters of interior surface 11 as well as different final lengths. However, the hose usually has an inner diameter in the range of from 2.5 to 120 cm (1 to 48 inches).

Another embodiment of the present invention may be considered (not shown) where sensor wire 14,16 is replaced with a chemical sensitive tape for application where material being transported is of a nature such that its presence may be sensed by means other than continuity. That is, the chemical sensitive tape can function as the sensor wires by indicating that the sensed layer about which the chemical sensitive tape is wrapped is worn by the absence of electrical continuity through the tape caused by chemical erosion or wear of the tape.

FIG. 4 shows a typical wear sensing device 60 (substantially identical with wear sensing device 62) comprising an ON/OFF switch 72, a power source (not shown), an LED 74, a buzzer 76, a Push-to-Test button 78, a buzzer select/deselect switch 80, an optional remote output 82, and an industrial strength RCA phono jack 56 (comparable to plug 58 of wear sensing devices 62) for connecting to the first and second two-pole sockets 42,44 of sensing elements 17,21. Internally (not shown), the wear sensing device 60 contains a wear monitor circuit (described hereinbelow with respect to FIG. 5) to monitor a wear sensing element 17,21 and control an alarm circuit.

Functionally, a wear sensing device 60,62 monitors a sensing element 17,21 by constantly checking continuity (resistance) of the circuit. A functioning circuit will measure a resistance, such as for example, less than 10,000 ohms that indicates that continuity of the sensing element is intact, implying that the sensed layer is functioning as required. Measuring a higher resistance, such as for example, greater than 100,000 ohms, indicates that continuity of the sensing element 17,21 has been broken, implying that the sensed layer has malfunctioned. In the latter instance, the functioning circuit activates an alarm 75. Alarm 75 consists of a flashing LED 74, an audible buzzer 76, and an optional signal from output 82 for a remote Programmable Logic Controller (PLC). Any or all of these alarms may be deployed, depending on the usage.

Figure 5:
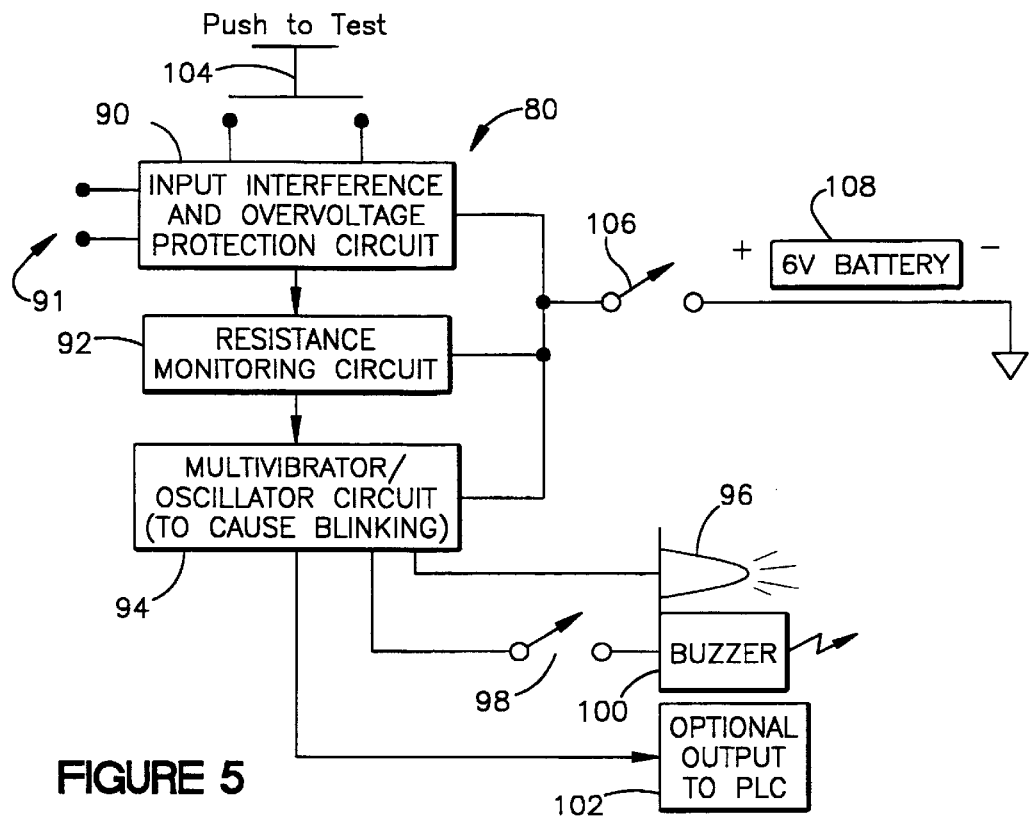
FIG. 5 is a simplified schematic block diagram of a hose wear-sensing device of FIG. 4.

FIG. 5 shows a simplified block diagram of a hose wear monitor circuit 80 of a wear sensing device 60,62. The circuit 80 includes an Input Interference and Overvoltage Protection circuit 90, which connects by output 91 to a wear sensing system 19,23 and protects the corresponding wear sensing device 60,62 from external noise and voltage spikes. The wear monitor circuit 80 also includes a Resistance Monitoring circuit 92, which measures the resistance of a wear sensing elements 17,21 to determine if continuity is present. A Multivibrator and Oscillator circuit 94 flashes an LED 96 if an alarm condition is present. Using a Buzzer Select/Deselect switch 98 the operator enables an audible alarm 100. A separate transistor output 102 can also be included as part of the wear sensing device 60. A device such as a Programmable Logic Controller (PLC) (not shown) monitors the transistor output 102 to annunciate alarms in a centralized control room or other remote location. A Push-to-Test switch 104 verifies proper operation of the wear sensing device 60. An ON/OFF switch 106 controls power flow to the wear sensing device 60 from conventional means such as a 6V battery circuit 108.

ALTERNATE EMBODIMENT

Figure 6:
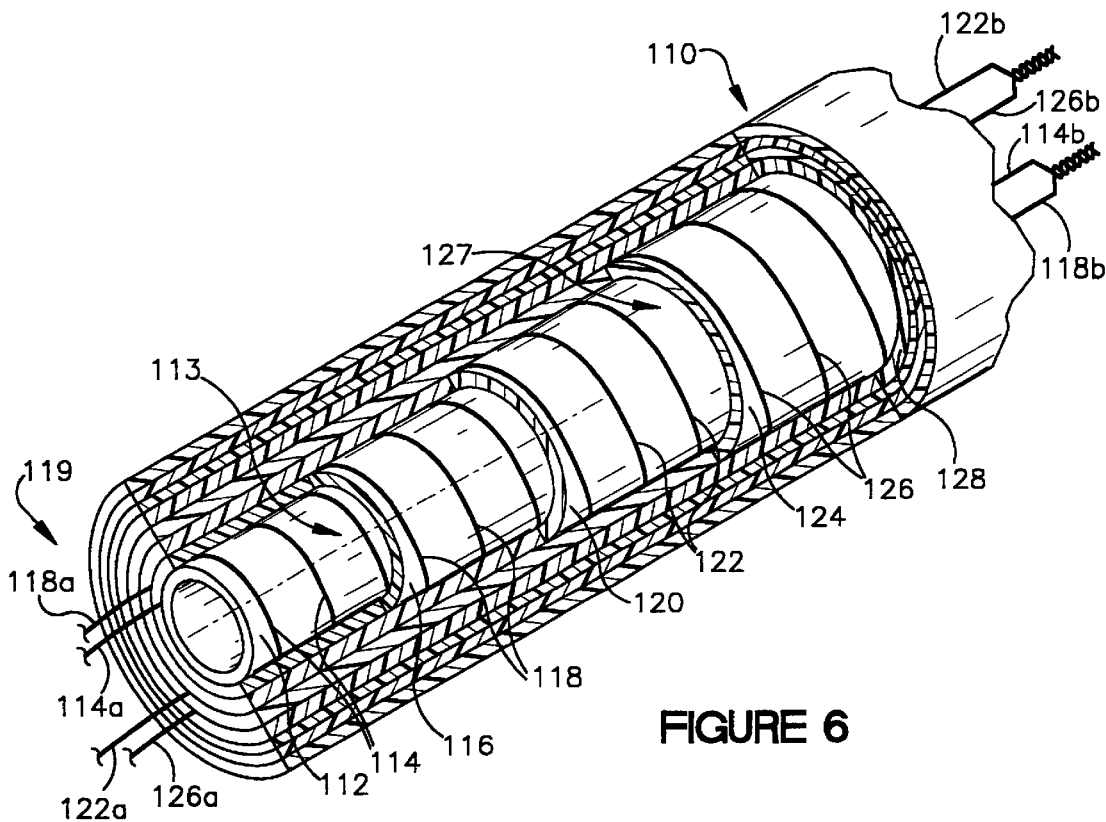
FIG. 6 is a perspective partial cut-away view of a section of another embodiment of a hose of this invention.

FIG. 6 shows a hose 110 constructed in accordance with a second embodiment of the present invention. Over a mandrel (not shown), an inner lining or tube 112 is applied, upon which a sensor wire 114 is spirally wound thereabout. Subsequently, an additional layer of insulating liner or tube 116 is applied, upon which a sensor wire 118 is spirally wound. The free ends 114a, 118a of sensor wires 114,118, respectively, are extended to or even beyond one end of the hose 110 and connect to a first two-pole socket (not shown but comparable to two-pole socket 42) as described hereinbefore. The other free ends 114b, 118b of sensor wires 114,118, respectively, are joined or spliced together to complete a first wear sensing element 119 (sensor wires 114,118 and two-pole socket 42) to detect wear in sensed layer 113. Subsequently, a layer 120 of tube or reinforcement ply is disposed over insulating tube or fabric layer 116. Layer 120 in turn has a single turn of sensor wire 122 spirally wound thereabout. A layer 124 of insulating tube or fabric is next applied, upon which a single turn of sensor wire 126 is spirally wound thereabout. Next, a reinforcement ply 128 is disposed over the layer 124 and sensor wire 126. The free ends 122a, 126a of sensor wires 122,126, respectively, extend to or even beyond one end of the hose 110 to connect to a second two-pole socket (not shown) in the manner described hereinbefore regarding the embodiment shown in FIGS. 1 and 2. The other free ends 122b, 126b of sensor wires 122,126 are joined or spliced together to complete a first sensing element 119. It is within the terms of the invention to provide wires 122,126 from a single strand of sensor wire that is simply applied on the inner layer 120 and then applied on the outer layer 124. The first sensing element 119 detects wear in sensed layer 113. Subsequent layers of sensor wires, carcass fabrics, tubes and reinforcement plies can be applied using this method depending on the number of wear sensing elements and reinforcement plies required for the usage.

Completion of the construction of the embodiment presented in FIG. 6 is similar with the construction method described regarding the first embodiment illustrated in FIGS. 2 and 3. The second embodiment can be connected to wear sensing devices such as devices 60,62 as described hereinbefore.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A hose for transporting abrasive material including an inner lining, a plurality of layers of reinforcement ply disposed over the inner lining, a first wear sensing element disposed in a first sensed layer at a first distance from the innermost surface of the inner lining, the hose characterized by:
   a second wear sensing element in a second sensed layer disposed at a second distance from the innermost surface of inner lining, the second distance being greater than the first distance;
   a second wear sensing device, connected to the second wear sensing element for providing an indication of propagation of a hose wear condition from the first sensed layer to the second sensed layer;
   the first wear sensing element comprises a first pair of sensor wires each having a first end extending to a first end of the hose and a second end extending to a second end of the hose; and
   the second wear sensing element comprises a second pair of sensor wires each have a first end extending to the first end of the hose and a second end extending to the second end of the hose;
   the second end of the first pair of sensor wires are connected to one another; and
   the second end of the second pair of sensor wires are connected to one another.

2. The hose according to claim 1, characterized in that:
   the first pair of sensor wires are insulated from each other by a layer; and
   the second pair of sensor wires are insulated from each other by a reinforcement layer.

3. The hose according to claim 1, characterized in that:
   the first ends of the first pair of sensor wires are connected to a first socket; and
   the first ends of the second pair of sensor wires are connected to a second socket.

4. The hose according to claim 3, characterized in that:
   the first and second wear-sensing device for providing an indication of wear from the innermost surface of inner lining to the first and second sensed layers are connected via the first and second sockets, respectively, to the first and second pairs of sensor wires, respectively.

5. A hose for transporting abrasive material, characterized by:
   an inner lining of elastomeric tube(s), two or more reinforcement layers applied over the inner lining, an outer cover applied over the outermost one of the reinforcement layers, wherein the hose has a length and two ends, characterized by:
   a first wear sensing element disposed at a distance from an interior surface of the hose, for indicating a wear condition resulting from transporting the abrasive material;
   a second wear sensing element, disposed in a second sensing layer between the reinforcement layers, at a greater distance from the interior surface of the hose, comprising a pair of sensor wires running substantially the entire length of the hose, and having one end of the sensor wires connected with one another and the other end connected to a second wear sensing device, said second wear sensing element also for indicating a wear condition resulting from transporting the abrasive material; and
   the pair of sensor wires of the second wear sensing element extend spirally over the length of the hose and are connected at end to a socket.

6. The hose according to claim 5, characterized in that:
   the first wear sensing element is disposed between the innermost surface of inner lining and a first sensing layer.

7. The hose according to claim 6, characterized in that:
   the first wear sensing element has two sensor wires, each having an end at the one end of the hose and connected to a first wear sensing device, and another end extending to the other end of the hose, and the ends are connected to one another.

8. The hose according to claim 7, characterized in that:
   the sensor wires of the first wear sensing element extends spirally over the length of the hose.

9. The hose according to claim 6, characterized in that:
   the wear sensing element is disposed in a second sensing laser between the reinforcement layers which is farther from the innermost surface of inner lining than the first sensing layer.

10. The hose according to claim 9, characterized in that the first and second wear sensing devices connected to the wear-sensing elements, respectively, provide an indication to the user when the hose has worn through to the innermost wear-sensing element, thereby permitting the user to reposition the hose so as to continue operation until a failure of the second wear-sensing element to maximize the useful life of the hose.

* * * * *